July 31, 1934.  A. A. TATUM  1,968,541
POISON POWDER DISTRIBUTOR
Filed June 12, 1930  2 Sheets-Sheet 1
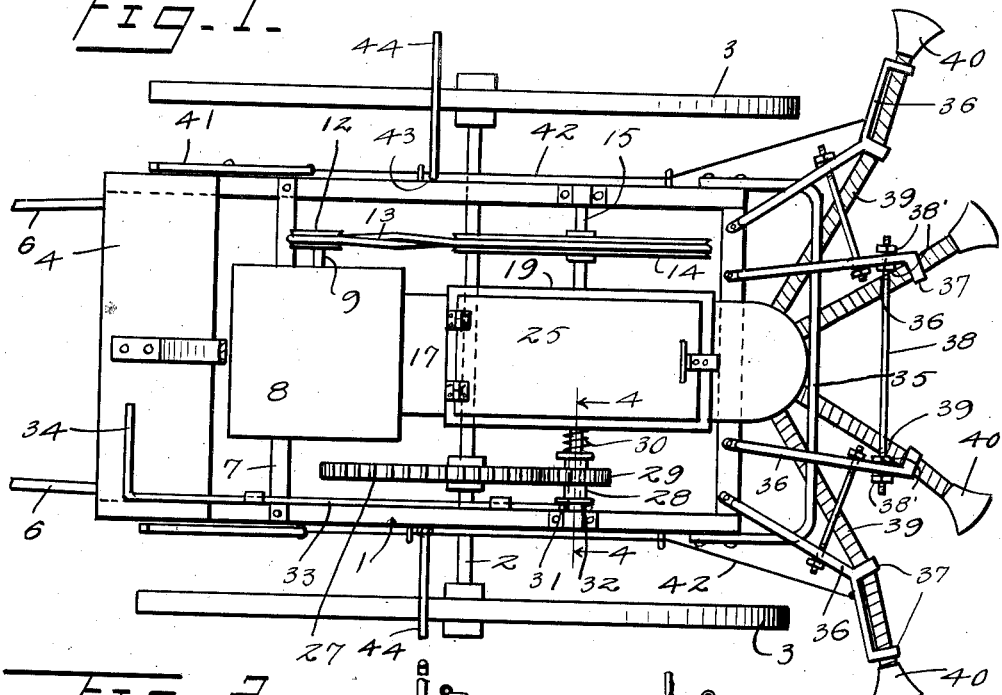
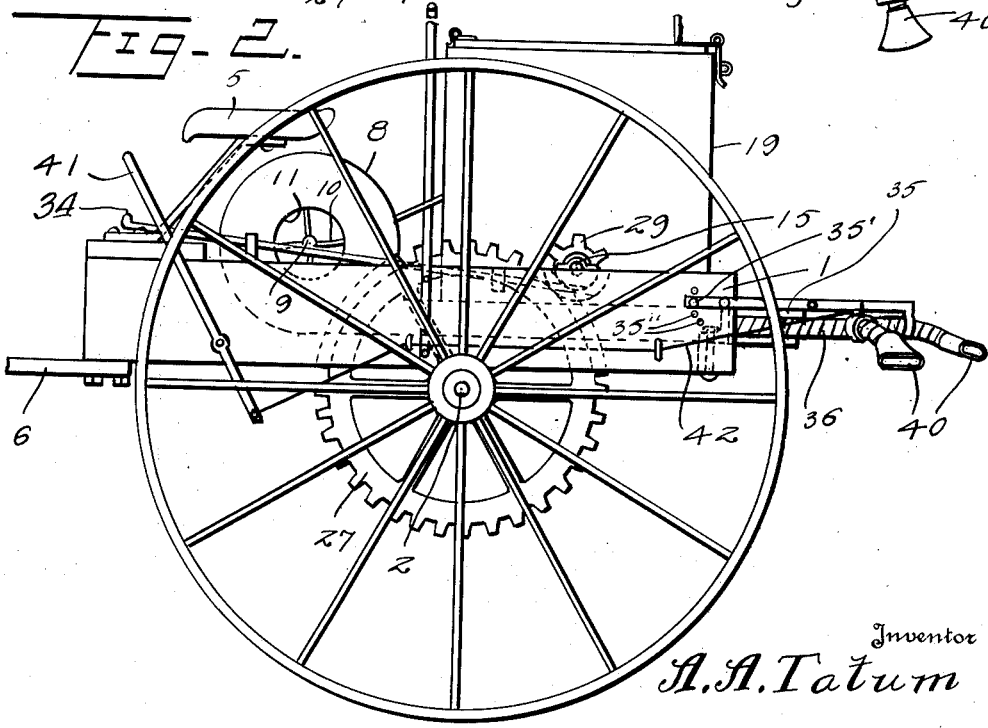
Inventor
A. A. Tatum
By Watson E. Coleman
Attorney July 31, 1934.  A. A. TATUM  1,968,541
POISON POWDER DISTRIBUTOR
Filed June 12, 1930   2 Sheets-Sheet 2
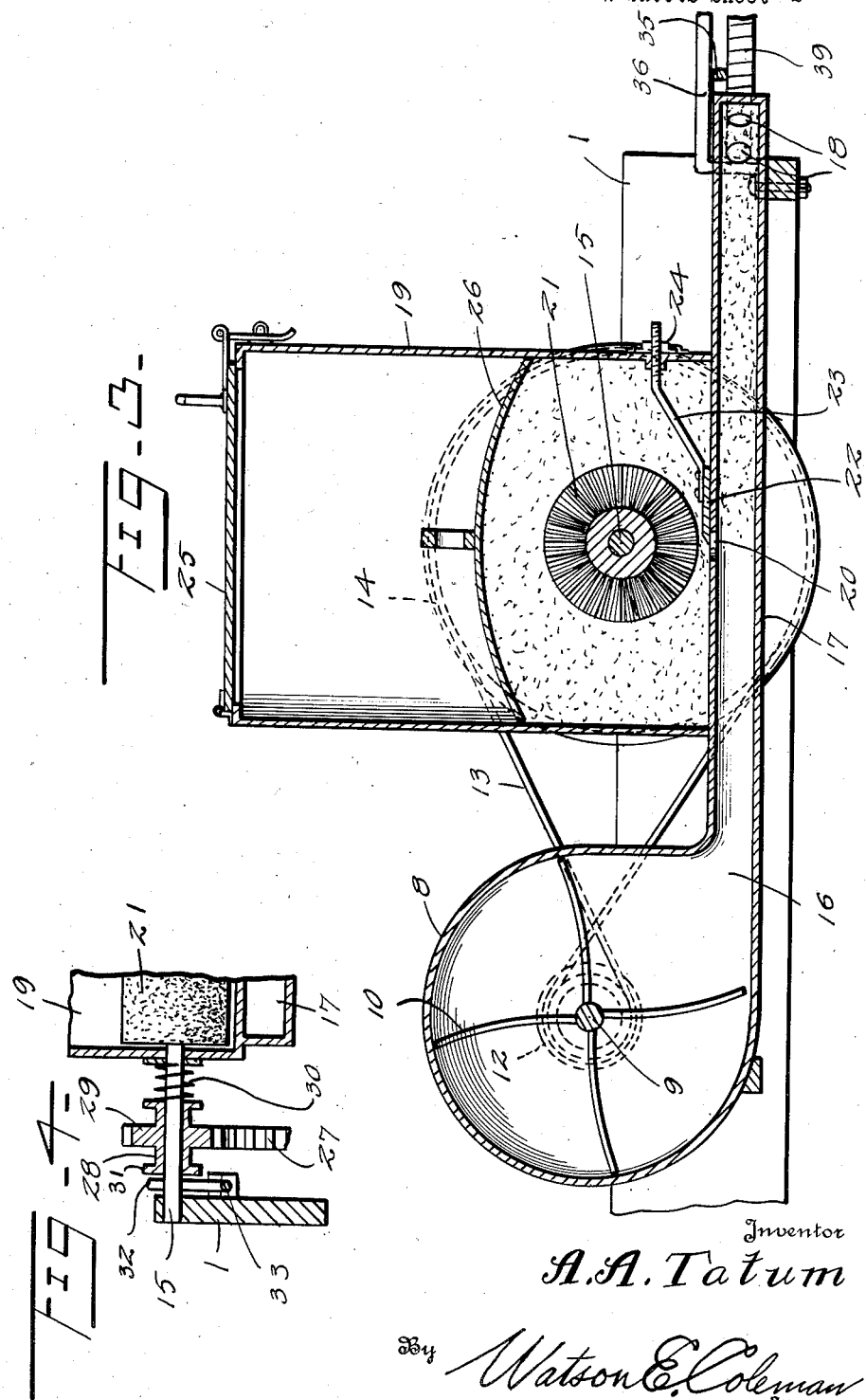
Inventor
A. A. Tatum
By Watson E. Coleman
Attorney Patented July 31, 1934

1,968,541

UNITED STATES PATENT OFFICE 1,968,541

POISON POWDER DISTRIBUTOR

Aldridge A. Tatum, Lafayette, Ala.

Application June 12, 1930, Serial No. 460,704

4 Claims. (Cl. 43—148)

This invention relates to improvements in a machine for distributing poison powder over plants and relates particularly to a boll weevil poison distributing machine.

The primary object of the present invention is to provide a machine having a mechanism for blowing poison powder over a wide area, wherein an improved means is provided for supplying the poison well agitated and well mixed to the blower mechanism so that it will be discharged therefrom in an extremely fine condition.

Another object of the invention is to provide a poison powder distributor having a plurality of discharge nozzles all of which may be adjusted to facilitate the application of the powder to the best advantage onto the plants.

A still further object of the invention is to provide a novel means for ejecting powder from a bin or receptacle through a discharge opening into an air channel from which the powder is delivered into distributing pipes.

Still another object of the invention is to provide a novel means for controlling the operation of the mechanism of the present invention so that the same may be drawn into or out of operation as desired, while the machine is in progress.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in top plan of the poison distributor embodying the present invention.

Figure 2 is a view in side elevation of the same.

Figure 3 is a vertical sectional view.

Figure 4 is a detailed sectional view taken on the line 4—4 of Figure 1.

Referring more particularly to the drawings wherein like numerals of reference indicate corresponding parts throughout the several views, the numeral 1 indicates generally the frame of the present machine which, as shown, is mounted upon a single centrally positioned axle 2, each end of which extends through and is secured in the hub of a ground engaging wheel 3.

Upon a platform 4 at the front end of the frame 1 is mounted a seat 5 for the operator of the machine and the front of the frame has secured thereto shafts 6 in which a draft animal may be hitched. While I have shown shafts for hitching a draft animal up to this machine it is, of course, to be understood that I do not wish to be limited to this means of moving the machine for it will be obvious that the same may be drawn by a tractor or any other suitable source of power.

Mounted in any suitable manner upon the frame 1, as for example upon one or more of the cross beams 7, at the forward end of the frame, is a fan housing 8 in which is mounted a fan shaft 9 carrying blades 10. This housing 8, which is of circular cross-section, as shown, has an air inlet opening 11 at one end thereof and through the central part of this opening the fan blade supporting shaft 9 extends. Upon the outer end of this shaft there is mounted a small pulley 12 which is connected through the medium of a belt 13 with a relatively large pulley 14 mounted upon the shaft 15 which extends transversely of the frame 1 adjacent the rear thereof.

At the bottom of the fan casing 8 an air outlet opening 16 is formed which discharges directly into a wide and shallow air tube 17 which extends rearwardly to and beyond the rear end of the frame 1. This air tube 17 is rounded at its rear end as shown and the vertical wall of this rounded end portion is provided with a number of outlet apertures 18, four being shown in the present case.

Mounted over and upon the air tube 17 is a box or hopper 19 designed to contain the poison powder which is to be distributed by the machine. The top of the air tube 17 which lies directly beneath the box 19 constitutes the bottom for the box and in the central part of the portion of the tube over which the box lies there is formed an aperture 20 through which powder may be discharged from the box or hopper 19 directly into the tube 17. The shaft 15 passes through the hopper 19 at a point above and in vertical alignment with the powder discharge aperture 20 as shown and within the hopper this shaft carries a brush 21 which is of such diameter that the ends of the bristles sweep across the opening 20.

Resting upon the top of the tube 17 within the hopper and adjacent the opening 20 is a cut off board 22 which may be shifted to decrease the size of the discharge opening 20 as necessary. This board carries an arm 23 which projects through a suitable aperture in the rear wall of the hopper 19 which projecting end is threaded and carries a nut 24 by means of which the plate may be secured in adjusted position.

Within the hopper, which has a hinged cover 25, there is placed an arcuate follower 26 which has its concave side directed downwardly and, snugly fitting in the hopper, it keeps the powder moving downwardly therein and also prevents it from escaping under the cover 25.

Upon the side of the hopper or powder box 19 opposite the pulley wheel 14 there is mounted, upon the axle 2, a large gear wheel 27, the shaft 15 adjacent the gear wheel 27 has slidably mounted thereon and keyed thereto a sleeve 28 which carries a gear pinion 29. Surrounding the shaft and interposed between the sleeve 28 and the adjacent wall of the powder box or hopper 19 is a coil spring 30 which normally urges the gear pinion away from the hopper and into mesh with the gear 27. The opposite end of the sleeve 28 from the spring carries a plate 31 against which bears a fork 32 which straddles the shaft 15 and which is carried by an oscillatable rod 33 which extends forwardly to the platform 4 where it terminates in the laterally directed arm 34. This arm 34 is normally raised slightly from the platform as shown so that when the operator of the machine presses his foot thereon and depresses it the fork 32 will be swung over against the plate 31 and will shift the sleeve 28 against the tension of the spring 30 to disengage the gear pinion 29 from the gear 27. Upon release of the arm 34 the spring 30 will take control and return the gear pinion 29 to a position where it will mesh with the gear 27, as will be obvious.

A supporting frame 35 is pivotally mounted upon the rear of the vehicle frame 1, over which there extends a number of rearwardly directed arms 36. As shown, the frame 35 is of U-shaped configuration and each side is pivotally attached to the frame 1 at a point inwardly of the free end thereof. Adjacent the end of each arm an aperture is formed through which may be extended a bolt 35' for selective engagement in a number of apertures 35" formed in the adjacent side of the frame.

By this means it will be readily seen that the frame 35 may be oscillated so as to raise or lower the arms 36 as desired. These arms 36 are attached at their inner ends to the rear cross bar of the frame 1 in such a manner that they may be swung upwardly or oscillated from side to side as desired and each arm carries or is formed at its outer end to provide one or more yokes or collars 37.

The arms 36 are connected by transversely extending bars 38, which, as shown, are threaded at each end to receive a pair of nuts between which an arm is positioned. By manipulation of these nuts, each of which is indicated by a numeral 38' the arms 36 may be spread apart or drawn together as desired.

Attached to the rear end of the air tube 17 are powder receiving and distributing pipes 39 each, of course, having one end in position to receive powder from the tube through an opening 18. The outer ends of these pipes 39 extend through the yokes of the adjacent supporting arms 36 and each terminates in a broad flat or duck bill distributing nozzle 40. In the present case there has been shown four of these pipes and distributing nozzles, the pipes being arranged in rearwardly divergent relation in the manner shown. The openings of the nozzles 40 of the outer ones of the four pipes are preferably wider than the nozzles of the center pipes so that a larger spread of powder will be effected by these particular pipes.

Pivotally mounted upon each side of the frame 1 adjacent the front thereof, is a lever 41 to which is attached a pull wire 42 which passes rearwardly along the side of the frame to the adjacent outer pipe supporting arm 36. These arms 36 are so mounted upon the frame 1 that when either of the levers 41 is oscillated in the proper direction the arms will be shifted so that the discharge nozzles 40 may be properly positioned with respect to the rows of plants between which the machine is passing, that the powder may be delivered directly onto the plants.

From the foregoing description it will be readily seen that when the hopper or box 19 is filled with poison powder and the machine is set into operation with the gear pinion 29 in mesh with the gear 27 the brush 21 will be rapidly rotated in the hopper beating the powder into a dust and forcing it downwardly into the air tube 17.

At the same time the fan blades 9 will be rapidly rotated forcing a blast of air out through the tube 17 and blowing the powder through the pipes 39 for discharge through the nozzles 40 at the outer ends thereof. When it is desired to move the machine without discharging powder from the nozzles the operator places his foot upon the arm 34 of the oscillatable shaft 33 so as to cause the shifting of the sleeve 28 in the manner previously described and the disconnection of the pinion 29 from the gear 27, this stops the operation of both the brush and the fan.

At each side of the frame 1 an upright bar or post 43 is mounted, the upper end of which is turned laterally outwardly as at 44. This outturned portion 44 of each post is provided for the support of a lantern or other suitable lighting element so that the machine may be used and transported at night as well as during the day.

Having thus described my invention, what I claim is:

1. A poison powder distributor of the character described, comprising a carriage including a frame, an axle and a pair of supporting wheels on said axle, a poison receptacle, a blower operated from said axle, flexible powder distributing tubes connected with said blower, a plurality of arms mounted upon said frame and each supporting a tube, connecting means between said arms whereby the same may be relatively adjusted in a substantially horizontal plane, and means whereby said arms and tubes may be moved vertically.

2. A poison powder distributor, comprising a carriage including a frame and supporting wheels therefor, a powder receptacle, a blower receiving powder from said receptacle, a plurality of flexible distributing tubes connected with said blower, a plurality of arms attached to said frame and each supporting a tube, each of said arms being mounted for universal movement, connecting means between said arms whereby the latter may be adjusted relative to one another in a substantially horizontal plane, and means whereby all of the arms and the tubes may be shifted as a unit vertically with respect to the carriage frame.

3. A poison powder distributor of the character described, comprising a wheel supported body, a powder receptacle mounted on the body, a powder conducting tube extending longitudinally of the body beneath the receptacle and adapted to receive powder from the receptacle, means for discharging air through said tube toward the rear thereof, a frame extending transversely of said body, a plurality of arms each swingingly secured to the body and extending rearwardly over and resting on said frame, a plurality of flexible powder distributing pipes each connected at one end with the rear end of said tube and supported adjacent its other end by an overlying arm, and a distributing nozzle upon the said other end of each pipe, said frame being vertically oscillatable on the body and operating to oscillate the outer ends of said arms.

4. A poison powder distributor, comprising a wheel carried body, a poison carrying receptacle mounted on the body, a relatively broad and flat poison conducting tube disposed longitudinally of the body beneath the receptacle and designed to receive powder therefrom, the rear end of the tube projecting beyond the rear end of the body and having its rear end of substantially semi-circular formation, a plurality of pipes extending radially from the semi-circular rear end of said tube, a substantially U-shaped frame extending across the rear of said body and having the free ends of the side members thereof pivotally attached to the body, the yoke portion being arranged in spaced relation to the rear of the body, a plurality of arms each pivotally secured at one end to the rear of the body and extending therefrom across said frame and resting thereon, each of said arms supporting at its outer end the other end of a pipe, distributing nozzles formed upon the other ends of said pipes, and rod members disposed between and connecting said arms and having adjustable connection therewith whereby relative horizontal adjustment of the arms may be effected, said arms being adjusted vertically as a unit by the oscillation of said frame.

ALDRIDGE A. TATUM.